United States Patent
Fraidlin et al.

[19]

[11] Patent Number: 6,144,564
[45] Date of Patent: Nov. 7, 2000

[54] SINGLE STAGE POWER CONVERTER AND METHOD OF OPERATION THEREOF

[75] Inventors: Simon Fraidlin, Plano, Tex.; Andrey Frolov, Moscow, Russian Federation; Anatoliy Polikarpov, Mesquite, Tex.

[73] Assignee: Lucent Technologies Inc., Murray Hill, N.J.

[21] Appl. No.: 09/305,907

[22] Filed: May 5, 1999

[51] Int. Cl.[7] ................................................ H02M 3/335
[52] U.S. Cl. ............................................. 363/16; 363/17
[58] Field of Search ................................ 363/16, 17, 20, 363/21, 47, 45, 25, 131, 132

[56] References Cited

U.S. PATENT DOCUMENTS

| | | | |
|---|---|---|---|
| 4,017,702 | 4/1977 | Harmon et al. | 323/279 |
| 5,430,633 | 7/1995 | Smith | 363/20 |
| 5,619,400 | 4/1997 | Bowman et al. | 363/15 |
| 5,619,404 | 4/1997 | Zak | 363/21 |
| 5,646,832 | 7/1997 | Pulhamus, Jr. et al. | 363/24 |
| 5,719,754 | 2/1998 | Fraidlin et al. | 363/17 |
| 5,796,595 | 8/1998 | Cross | 363/16 |
| 5,822,198 | 10/1998 | Fraidlin et al. | 363/17 |

*Primary Examiner*—Peter S. Wong
*Assistant Examiner*—Rajnikant B. Patel

[57] ABSTRACT

A single stage power converter, a method of processing rectified AC power, and a power supply incorporating the converter or the method. In one embodiment, the converter is couplable via a rectifier to a source of AC power, has a filter capacitor and an isolation transformer with a primary winding, and includes: (1) a significant energy storage device coupled to the primary winding, (2) a first switch, coupled to the primary winding, that conducts intermittently to couple the primary winding to the rectifier to transfer a portion of rectified AC power to a magnetizing inductance of the isolation transformer and (3) a second switch, coupled between the primary winding and the significant energy storage device, that conducts alternately with the first switch, the first and second switches substantially zero-voltage switching and the converter correcting a power factor of the AC power.

20 Claims, 2 Drawing Sheets

SINGLE STAGE POWER CONVERTER AND METHOD OF OPERATION THEREOF

TECHNICAL FIELD OF THE INVENTION

The present invention is directed, in general, to power supplies and, more specifically, to a single stage power converter, a method of operation thereof and a power supply employing the same.

BACKGROUND OF THE INVENTION

Developing highly-efficient power supplies, especially in combination with the ever-increasing constraints of high power density, is a continuing goal in power electronics. A switched-mode power converter is a frequently employed component of a power supply that converts an input voltage or current waveform into a specified output voltage or current waveform. There are several types of switched-mode converters including, for instance, a zeta converter.

A conventional zeta converter includes a power switch coupled to a controller, an isolation transformer, a storage capacitor, a rectifier and an output filter. The zeta converter generally operates as follows. The power switch conducts for a primary interval D to convey power from the input to the isolation transformer. During the primary interval D, energy is stored in the magnetizing inductance of the isolation transformer and flows from the storage capacitor to the output of the zeta converter. Then, for a complementary interval 1-D, the power switch is not conducting. The energy stored in the magnetizing inductance of the isolation transformer now flows to the storage capacitor.

The controller monitors the output voltage of the zeta converter and adjusts the duty cycle of the power switch to ultimately control the output voltage of the zeta converter. This degree of control provides a mechanism to maintain the output voltage at a relatively consistent level despite relative fluctuations in the input voltage and the load at the output.

In off-line power supply applications, a high power factor is frequently required. While a power factor of unity (i.e., 1.0) is the ultimate goal, a lesser power factor may, in some cases, be considered acceptable. Therefore, in applications employing the zeta converter, a power factor corrector (PFC) may be necessary to provide an acceptable power factor for the power supply.

An additional converter, such as a boost converter operating in a continuous conduction mode of operation or in a discontinuous conduction mode of operation (with the appropriate control circuitry), may serve as the PFC for the zeta converter. While the additional converter will provide an acceptable power factor for the power supply employing the zeta converter, there are several disadvantages. First, the power supply now employs two separate converter stages, each with an independent controller, to provide power conversion. As a result, the overall efficiency of the power supply is reduced because of the inherent inefficiencies associated with the two separate and distinctly controlled converter stages. Second, employing a boost converter, or any other power converter, to serve as a power factor corrector adds complexity to the power supply. With the goal of increasing the power density of the power supply, the additional converter detracts from, rather than facilitates, the simplicity of design of the power supply.

Accordingly, what is needed in the art is an single stage power converter that provides both a well-regulated output and a high power factor for a power supply employing the single stage power converter.

SUMMARY OF THE INVENTION

To address the above-discussed deficiencies of the prior art, the present invention provides a single stage power converter, a method of processing rectified AC power, and a power supply incorporating the converter or the method. In one embodiment, the converter is couplable via a rectifier to a source of AC power, has a filter capacitor and an isolation transformer with a primary winding, and includes: (1) a significant energy storage device coupled to the primary winding, (2) a first switch, coupled to the primary winding, that conducts intermittently to couple the primary winding to the rectifier to transfer a portion of rectified AC power to a magnetizing inductance of the isolation transformer and (3) a second switch, coupled between the primary winding and the significant energy storage device, that conducts alternately with the first switch, the first and second switches substantially zero-voltage switching and the converter correcting a power factor of the AC power.

The present invention therefore introduces a single stage power converter having an energy storage device of significant value, preferably, on its primary side. The value of the energy storage device is sufficient to allow it to clamp the primary winding of the isolation transformer and correct, to a meaningful extent, the power factor. The significantly smaller capacitors of the prior art were never designed or intended to assist in power factor correction. For purposes of the present invention, a "significant energy storage device" is a capacitor or other energy storage device having a value proportional to a power output $P_{out}$ of the power converter and inversely proportional to (1) an average voltage $V_{C1}$ across the significant energy storage device, (2) a ripple voltage $\Delta V_{p-p}$ across the significant energy storage device and (3) an angular frequency $\omega_{ac}$ of the AC power. The value of the significant energy storage device may be expressed as:

$$C \geq \frac{P_{out}}{V_{C1} \cdot \Delta V_{p-p} \cdot \omega_{ac}}$$

where C represents the value of the capacitor or significant energy storage device.

In one embodiment of the present invention, the isolation transformer has first and second secondary windings. The converter further includes a second energy storage device coupled between the first and second secondary windings. In an embodiment to be illustrated and described, the second energy storage device, is a capacitor or other energy storage device having a value proportional to the value of the significant energy storage device. The value of the second energy storage device may be about:

$$C2 = C1/n^2$$

where: C2 represents the value of the second energy storage device;

n represents a turns ratio between the primary winding and the first secondary winding; and C1 represents the value of the significant energy storage device.

In a related embodiment, the second secondary winding is an integrated output filter inductance. The isolation transformer and the output filter inductance may be embodied in an integrated magnetic device to minimize component count. Those skilled in the pertinent art are familiar with integrated magnetic devices. While not necessary to the present invention, the isolation transformer and output filter inductance can be advantageously integrated to improve the converter's overall efficiency.

In one embodiment of the present invention, a main output of the converter is further coupled in series to a post-regulator. The post regulator can be employed to introduce a marginal voltage adjustment to an output of the converter, thereby improving the regulation of the output. In a more specific embodiment of the present invention, the post-regulator includes a buck converter. Those skilled in the pertinent art understand, however, that other regulators, including other converter topologies suitable for use in post-regulators, are within the broad scope of the present invention.

In one embodiment of the present invention, the converter further includes a controller coupled to the first and second switches. The controller controls conduction intervals of the first and second switches based on a characteristic of the converter. In an embodiment to be illustrated and described, the controller monitors the output voltage and input current of the converter and causes the first and second switches to alternately conduct in response thereto. Of course, those skilled in the pertinent art understand that other control points within the converter, or power supply as a whole, are well within the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
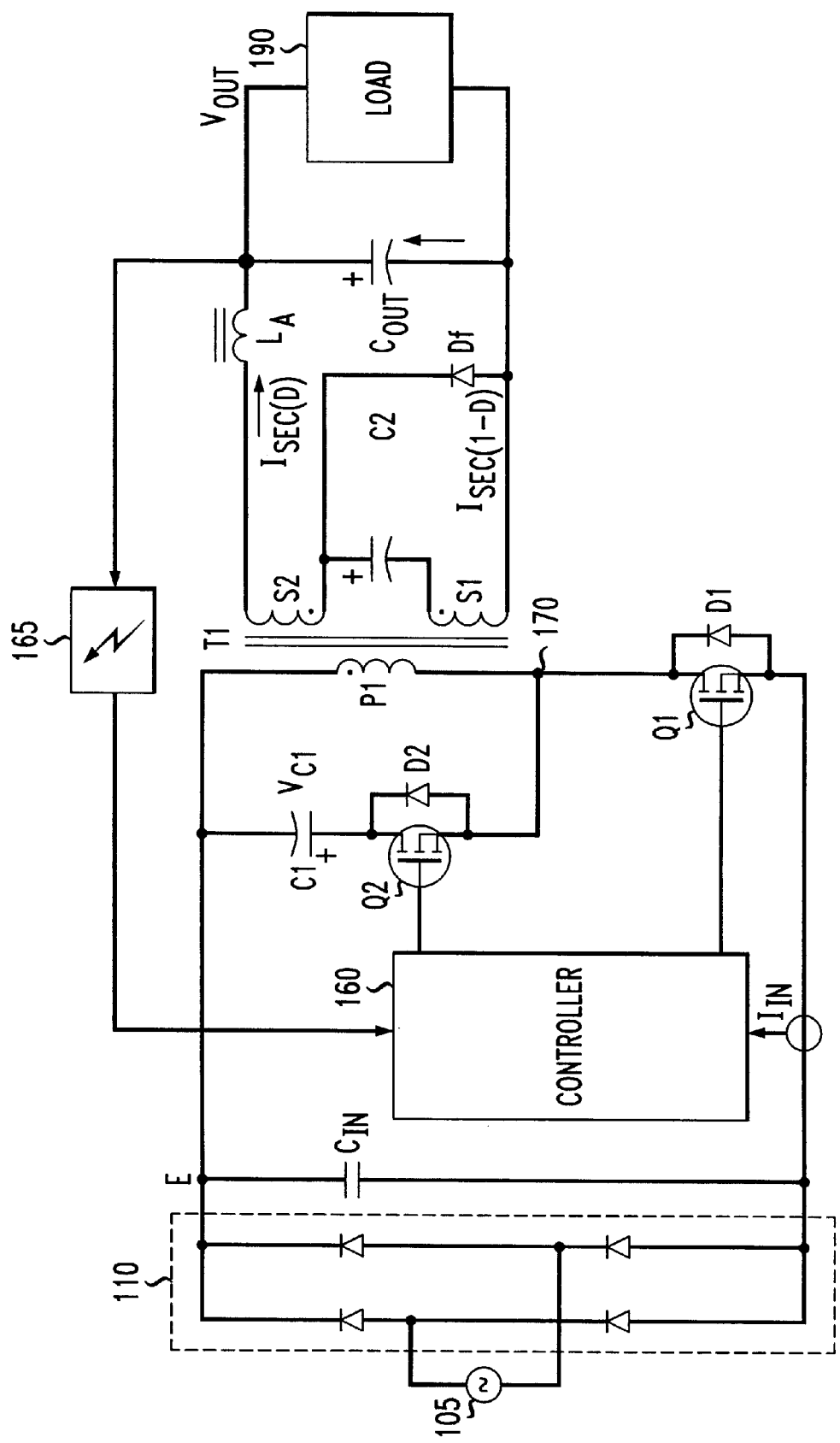
FIG. 1 illustrates a simplified schematic diagram of an embodiment of a single stage power converter constructed in accordance with the principles of the present invention.

Referring initially to FIG. 1, illustrated is a simplified schematic diagram of an embodiment of a single stage power converter 100 constructed in accordance with the principles of the present invention. The power converter 100 has an input couplable to a source 105 of AC power and an output couplable to a load 190. An input of the power converter 100 is coupled to a rectifier 110. The rectifier 110 receives the AC power and develops therefrom rectified AC power. The power converter 100 further includes a filter capacitor $C_{IN}$ coupled to the rectifier 110. The power converter 100 further includes an isolation transformer T1 having a primary winding P1 and first and second secondary windings S1, S2. While the illustrated isolation transformer T1 has two secondary windings S1, S2, those skilled in the pertinent art realize that isolation transformers having one or more secondary windings are well within the broad scope of the present invention.

The power converter 100 further includes a significant energy storage device C1 coupled to the primary winding P1. For purposes of the present invention, a "significant energy storage device" is a capacitor or other energy storage device having a value proportional to a power output $P_{out}$ of the power converter 100 and inversely proportional to (1) an average voltage $V_{C1}$ across the significant energy storage device C1, (2) a ripple voltage $\Delta V_{p-p}$ across the significant energy storage device C1 and (3) an angular frequency $\omega_{ac}$ of the AC power. The value of the significant energy storage device may be expressed as:

$$C \geq \frac{P_{out}}{V_{C1} \cdot \Delta V_{p-p} \cdot \omega_{ac}}$$

where C represents the value of the capacitor or significant energy storage device.

The power converter 100 further includes a first switch Q1 coupled to the primary winding. The first switch Q1 conducts intermittently to couple the primary winding P1 to the rectifier 110 to transfer a portion of the rectified AC power to a magnetizing inductance of the isolation transformer T1. The power converter 100 further includes a second switch Q2 coupled between the primary winding P1 and the significant energy storage device C1. The second switch Q2 conducts alternately with the first switch Q1. While the first and second switches Q1, Q2 are illustrated as metal oxide semiconductor field-effect transistors (MOSFETs), those skilled in the pertinent art understand that the present invention encompasses all controllable switches, whether conventional or later-developed, including bipolar junction transistors (BJTs), insulated gate bipolar transistors (IGBTs) and gate turn-off thyristors (GTOs).

The power converter 100 further includes a second energy storage device C2 series-coupled between the first and second secondary windings S1, S2. In the illustrated embodiment, the second energy storage device C2 has a value proportional to the value of the significant energy storage device C1. The value of the second energy storage device C2 may be about:

$$C2 = C1/n^2$$

where: C2 represents the value of the second energy storage device;

n represents a turns ratio between the primary winding P1 and the first secondary winding S1; and C1 represents the value of the significant energy storage device C1.

The power converter 100 further includes a freewheeling diode Df coupled to the second secondary winding S2. The power converter 100 further includes an ancillary inductor $L_A$ coupled between the second secondary winding S2 and the output. Those skilled in the pertinent art understand that the ancillary inductor $L_A$ is not required by the present invention and that the leakage inductance of the isolation transformer T1 maybe used in place of the ancillary inductor $L_A$. The power converter 100 still further includes an output capacitor $C_{OUT}$, coupled across the output, that filters and smooths the output voltage $V_{OUT}$.

Increasing power density and efficiency while reducing component count and cost is a continuing goal in power electronics. The isolation transformer T1 of the illustrated embodiment, therefore, is an integrated magnetic device having first and second secondary windings S1, S2. The first secondary winding S1 is a secondary winding while the second secondary winding S2 is an integrated output filter inductance. Integrating the output filter inductance into the isolation transformer T1 allows the power converter 100 to employ only one magnetic device, thus reducing component count and cost and increasing overall efficiency. Those skilled in the pertinent art are familiar with integrated magnetic devices. Integrated magnetic devices are discussed in U.S. Pat. No. 5,619,400 entitled "Magnetic Core Structures and Construction Techniques Therefor" issued to Bowman, et al. on Apr. 8, 1997. The foregoing reference is herein incorporated by reference. Of course, the integration of the isolation transformer T1 and the output filter inductance is not necessary to the present invention.

The power converter 100 still further includes a controller 160, coupled to the first and second switches Q1, Q2, that controls conduction intervals of the first and second switches Q1, Q2, based on a characteristic of the power converter 100. In the illustrated embodiment, the controller 160 is coupled to an isolating feedback network 165 (e.g., an opto-isolation device). Those skilled in the pertinent art are familiar with conventional isolating feedback networks. Of course, the isolating feedback network 165 is not necessary to the present invention. The controller 160 monitors the input current $I_{IN}$ and, via the isolating feedback network 165, the output voltage $V_{OUT}$ of the power converter 100. The controller 160 alternately actuates the first and second switches Q1, Q2 to regulate the output voltage $V_{OUT}$ at the output and correct a power factor of the AC power at the input of the power converter 100.

Since the switching frequency of the power converter 100 is substantially greater than the line frequency of the AC power, the operation of the power converter 100 will be described with respect to both a high frequency domain (corresponding to the switching frequency of the first and second switches Q1, Q2) and a low frequency domain (corresponding to the line frequency of the AC power).

The power converter 100 operates as follows in a high frequency domain. The first switch Q1 conducts for a primary interval D to apply the rectified input voltage E across the primary winding P1 of the isolation transformer T1. During the primary interval D, the input current $I_{IN}$ flows through the primary winding P1 and energy is stored in the magnetizing inductance of the isolation transformer T1. The second switch Q2 is not conducting and the significant energy storage device C1 maintains its charge. A secondary current $I_{SEC(D)}$ flows through the first secondary winding S1, the second energy storage device C2, the second secondary winding S2 and the ancillary inductor $L_A$ to charge the output capacitor $C_{OUT}$ and power the load 190. The freewheeling diode Df is reverse biased.

The first switch Q1 is then turned off at the end of the primary interval D. A magnetizing current in the isolation transformer T1 now flows through the body diode D2 of the second switch Q2 to charge the significant energy storage device C1. With a current through its body diode D2, the second switch Q2 may now be turned on with substantially zero volts there across to initiate a complementary interval 1-D. The current through the body diode D2 thus forms a closed current path through the filter capacitor $C_{IN}$.

As current flows through the significant energy storage device C1, the significant energy storage device C1 replenishes its charge during an initial portion of the complementary interval 1-D, and clamps the voltage across the primary winding P1. At a subsequent portion of the complementary interval 1-D, the current through the significant energy storage device C1 changes direction, flowing out of the significant energy storage device C1 and through the now turned-on second switch Q2.

In the secondary side of the isolation transformer T1, a secondary current $I_{SEC(1-D)}$ flows through the freewheeling diode Df. A first portion of the secondary current $I_{SEC(1-D)}$ flows through the second secondary winding S2 and the ancillary inductor $L_A$ to power the load 190. A second portion of the secondary current $I_{SEC(1-D)}$ flows through the second energy storage device C2 and the first secondary winding S1. The significant energy storage device C1, the second energy storage device C2 and the output capacitor $C_{OUT}$ are thus effectively parallel-coupled across the output of the power converter 100.

The current through the significant energy storage device C1 reverses directions during the subsequent portion of complementary interval 1-D as energy in the magnetizing inductance of the isolation transformer T1 is delivered to the secondary and the output. The second switch Q2 is then turned off to end the complementary interval 1-D. An inductive kick in the primary winding P1 now drives a voltage at a node 170 between the first and second switches Q1, Q2 to common. The first switch Q1 may now be turned on with substantially zero volts there across to repeat the primary interval D. The current through the body diode D1 thus forms a closed current path through the filter capacitor $C_{IN}$.

In a low frequency domain, the power converter 100 provides both power factor correction for the input AC power and voltage regulation of the output voltage $V_{OUT}$. The controller 160 monitors the input current $I_{IN}$ and, via the isolating feedback network 165, the output voltage $V_{OUT}$ of the power converter 100. The controller 160 adjusts the conduction intervals of the first and second switches Q1, Q2 to maintain the output voltage $V_{OUT}$ at a substantially constant level and to shape the input current $I_{IN}$ to provide a high power factor for the input AC power.

While the output voltage $V_{OUT}$ of the power converter 100 is substantially constant, it may exhibit an AC line frequency ripple. Therefore, it may be advantageous to introduce a post-regulator having an output coupled in series with the main output of the power converter. The post-regulator develops a marginal voltage adjustment that is added to the voltage at the main output of the power converter, thereby enhancing the regulation of the output and suppressing the AC line frequency ripple.

Figure 2:
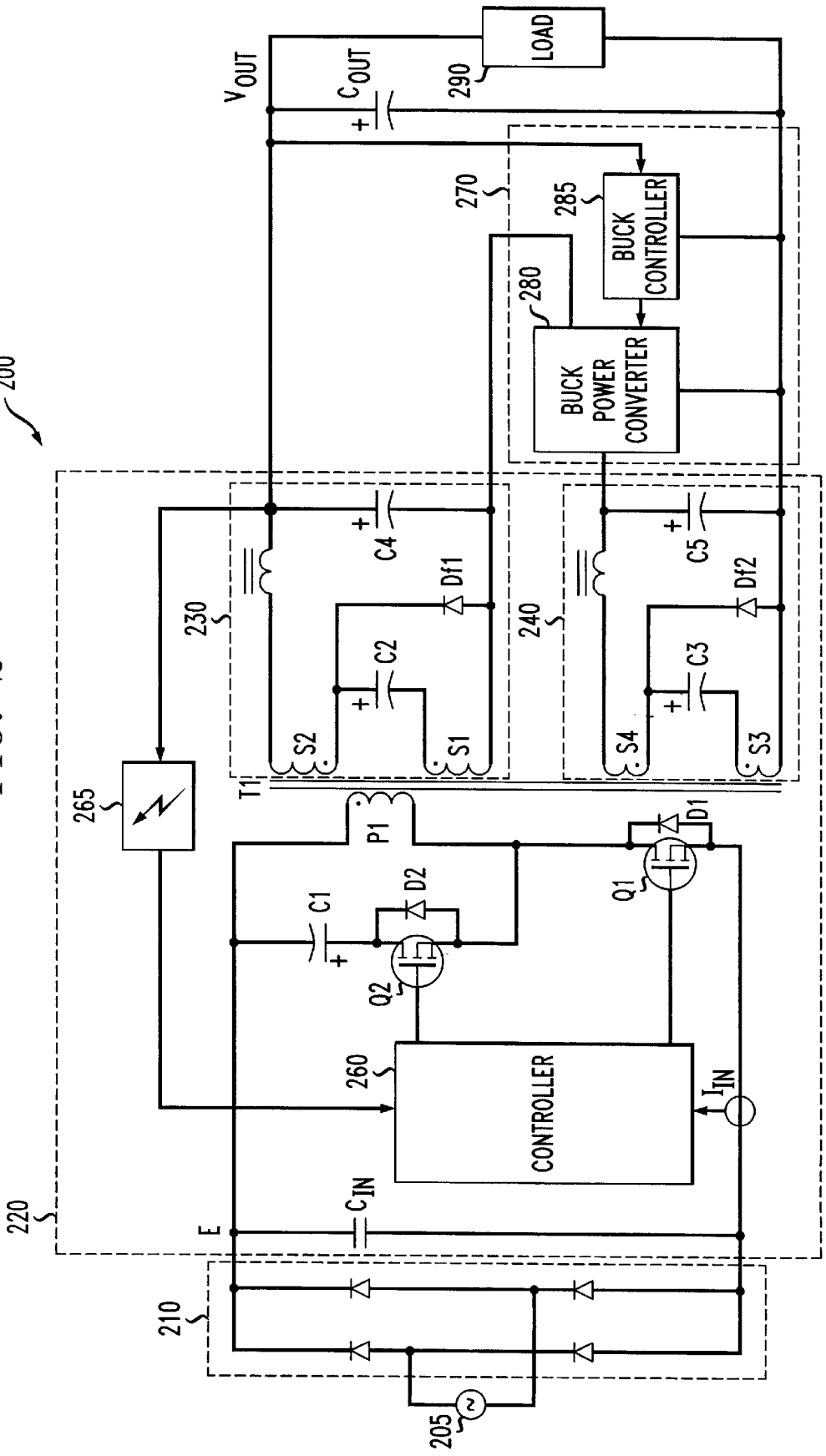
FIG. 2 illustrates a simplified schematic diagram of an embodiment of a power supply constructed in accordance with the principles of the present invention.

Turning now to FIG. 2, illustrated is a simplified schematic diagram of an embodiment of a power supply 200 constructed according to the principles of the present invention. The power supply 200 will be discussed with continuing reference to FIG. 1. The power supply 200 has an input couplable to a source of AC power 205 and an output couplable to a load 290. The power supply 200 includes a rectifier 210 coupled to the input. The rectifier 210 receives the AC power and develops therefrom rectified AC power.

The power supply 200 further includes a single stage power converter 220 coupled to the rectifier 210. The single stage power converter 220 is substantially similar to the single stage power converter 100 of FIG. 1 (and thus a detailed discussion of the operation will not hereinafter be submitted), but has an additional output circuit. In the illustrated embodiment, the single stage power converter 220 includes a main output circuit 230 and an auxiliary output circuit 240. Of course, the single stage power converter 220 need have only one output circuit. The single stage power converter 220 further includes a controller 260, coupled to the first and second switches Q1, Q2, that controls conduction intervals of the first and second switches Q1, Q2, based on a characteristic of the power converter 220. In the illustrated embodiment, the controller 260 monitors the output voltage of the main output circuit 230 through an isolating feedback network 265. The controller 260 may thus regulate the output voltage of the main output circuit 230.

The power supply 200 still further includes a post-regulator 270 having an input coupled to the auxiliary output circuit 240 to receive power therefrom. The output of the post-regulator 270 is coupled in series with the main output circuit 230. In the illustrated embodiment, the post-regulator 270 includes a buck power converter 280. Those skilled in the pertinent art are familiar with buck power converters. Of course, other regulators, including other converter topologies suitable for use in post-regulators 270, are well within the broad scope of the present invention. A buck controller 285, coupled to the buck power converter 280 and the output of the power supply 200, monitors the output voltage $V_{OUT}$ and regulates the output of the buck power converter 280 such that the buck power converter produces a marginal voltage required to maintain the output of the power supply 200 at a substantially precise and deliberately chosen level. Since the output of the buck power converter 280 is coupled to the main output circuit 230, the output voltage of the buck power converter 280 is added to the output voltage of the main output circuit 230 to produce the overall output voltage $V_{OUT}$ at the output of the power supply 200. The buck power converter 280 may thus facilitate the regulation of the output voltage $V_{OUT}$ of the power supply 200.

Those skilled in the art should understand that the previously described embodiments of the single stage power converter and power supply are submitted for illustrative purposes only and other embodiments of the single stage power converter having an energy storage device of significant value to allow it to clamp the primary winding of the isolation transformer and correct, to a meaningful extent, the power factor of the power processed in the converter are well within the broad scope of the present invention. Additionally, exemplary embodiments of the present invention have been illustrated with reference to specific electronic components. Those skilled in the art are aware, however, that components may be substituted (not necessarily with components of the same type) to create desired conditions or accomplish desired results. For instance, multiple components may be substituted for a single component and vice-versa.

For a better understanding of a variety of power converter topologies employing discrete and integrated magnetic techniques, see *Modern DC-to-DC Switchmode Power Converter Circuits,* by Rudolph P. Severns and Gordon Bloom, Van Nostrand Reinhold Company, New York, N.Y. (1985); and *Principles of Power Electronics,* by John G. Kassakian, Martin F. Schlect and George C. Verghese, Addison-Wesley Publishing Company, Reading, Mass. (1991). The above-listed references are incorporated herein by reference in their entirety.

Although the present invention has been described in detail, those skilled in the art should understand that they can make various changes, substitutions and alterations herein without departing from the spirit and scope of the invention in its broadest form.

What is claimed is:

1. A single stage power converter, couplable via a rectifier to a source of AC power, having a filter capacitor and an isolation transformer with a primary winding and comprising:

a significant energy storage device coupled to said primary winding;

a first switch, coupled to said primary winding, that conducts intermittently to couple said primary winding to said rectifier to transfer a portion of rectified AC power to a magnetizing inductance of said isolation transformer; and a second switch, coupled between said primary winding and said significant energy storage device, that conducts alternately with said first switch, said first and second switches substantially zero-voltage switching and said converter correcting a power factor of said AC power.

2. The converter as recited in claim 1 wherein said isolation transformer has first and second secondary windings, said converter further comprising a second energy storage device coupled between said first and second secondary windings.

3. The converter as recited in claim 2 wherein a value of said second energy storage device is proportional to a value of said significant energy storage device.

4. The converter as recited in claim 2 wherein said second secondary winding is an integrated output filter inductance, said isolation transformer and said output filter inductance being embodied in an integrated magnetic device.

5. The converter as recited in claim 1 further comprising a post-regulator, coupled in series with a main output of said converter, that enhances a regulation of an output of said converter.

6. The converter as recited in claim 5 wherein said post-regulator comprises a buck converter.

7. The converter as recited in claim 1 further comprising a controller, coupled to said first and second switches, that controls conduction intervals of said first and second switches based on a characteristic of said converter.

8. For use with a single stage power converter couplable via a rectifier to a source of AC power and having a filter capacitor, an isolation transformer with a primary winding, a method of processing rectified AC power in said converter, comprising:

causing a first switch, coupled to said primary winding, to conduct intermittently to couple said primary winding to said rectifier to transfer a portion of said rectified AC power to a magnetizing inductance of said isolation transformer; and causing a second switch, coupled between said primary winding and a significant energy storage device, to conduct alternately with said first switch, said first and second switches substantially zero-voltage switching and said converter correcting a power factor of said AC power.

9. The method as recited in claim 8 wherein said isolation transformer has first and second secondary windings, said method further comprising further processing said rectified AC power through a second energy storage device coupled between said first and second secondary windings.

10. The method as recited in claim 9 wherein a value of said second energy storage device is proportional to a value of said significant energy storage device.

11. The method as recited in claim 9 wherein said second secondary winding is an integrated output filter inductance, said method further comprising filtering said output power with said output filter inductance, said isolation transformer and said output filter inductance being embodied in an integrated magnetic device.

12. The method as recited in claim 8 further comprising enhancing a regulation of an output of said converter with a post-regulator coupled in series with a main output of said converter.

13. The method as recited in claim 12 wherein said post-regulator comprises a buck converter.

14. The method as recited in claim 8 further comprising controlling conduction intervals of said first and second switches based on a characteristic of said converter.

15. A power supply, comprising:
- a single stage power converter, couplable via a rectifier to a source of AC power, having a filter capacitor and an isolation transformer with a primary winding and first and second secondary windings, said converter including:
  - a significant energy storage device coupled to said primary winding;
  - a first switch, coupled to said primary winding, that conducts intermittently to couple said primary winding to said rectifier to transfer a portion of rectified AC power to a magnetizing inductance of said isolation transformer; and
  - a second switch, coupled between said primary winding and said significant energy storage device, that conducts alternately with said first switch, said first and second switches substantially zero-voltage switching and said converter correcting a power factor of said portion of said AC power;
- a post-regulator coupled in series with a main output of said converter, that enhances a regulation of an output of said power supply; and
- a controller coupled to said first and second switches.

16. The power supply as recited in claim 15 further comprising a second energy storage device coupled between said first and second secondary windings.

17. The power supply as recited in claim 16 wherein a value of said second energy storage device is proportional to a value of said significant energy storage device.

18. The power supply as recited in claim 15 wherein said second secondary winding is an integrated output filter inductance, said isolation transformer and said output filter inductance being embodied in an integrated magnetic device.

19. The power supply as recited in claim 15 wherein said post-regulator comprises a buck converter.

20. The power supply as recited in claim 15 wherein said controller controls conduction intervals of said first and second switches based on a characteristic of said converter.

* * * * *